US008633849B2

(12) United States Patent
Shibata et al.

(10) Patent No.: US 8,633,849 B2
(45) Date of Patent: Jan. 21, 2014

(54) RADAR DEVICE, OBJECT DETECTION SYSTEM, AND OBJECT DETECTION METHOD

(75) Inventors: Shinichi Shibata, Kobe (JP); Hideki Kajioka, Kobe (JP); Hiroyuki Ishimori, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 274 days.

(21) Appl. No.: 13/027,727

(22) Filed: Feb. 15, 2011

(65) Prior Publication Data

US 2011/0205102 A1 Aug. 25, 2011

(30) Foreign Application Priority Data

Feb. 23, 2010 (JP) ................... 2010-036989

(51) Int. Cl.
G01S 13/93 (2006.01)

(52) U.S. Cl.
USPC .............................. 342/70; 342/71

(58) Field of Classification Search
USPC ..................... 342/70–72
See application file for complete search history.

(56) References Cited

U.S. PATENT DOCUMENTS

| | | | | |
|---|---|---|---|---|
| 6,249,243 B1 * | 6/2001 | Takagi | ............................. | 342/70 |
| 6,380,884 B1 * | 4/2002 | Satou et al. | ..................... | 342/70 |
| 6,518,916 B1 * | 2/2003 | Ashihara et al. | ................ | 342/70 |
| 6,768,446 B2 * | 7/2004 | Tamatsu et al. | ................. | 342/70 |
| 6,862,527 B2 * | 3/2005 | Okamura et al. | ............. | 701/301 |
| 8,378,883 B2 * | 2/2013 | Kuoch | ............................. | 342/70 |
| 2003/0174054 A1 * | 9/2003 | Shimomura | .................. | 340/435 |
| 2010/0109937 A1 * | 5/2010 | Koike | ............................. | 342/70 |
| 2010/0156699 A1 * | 6/2010 | Kuoch | ............................. | 342/70 |

FOREIGN PATENT DOCUMENTS

| | | |
|---|---|---|
| JP | A-7-253467 | 10/1995 |
| JP | A-2002-122663 | 4/2002 |
| JP | A-2003-57339 | 2/2003 |
| JP | A-2004-132734 | 4/2004 |
| JP | A-2006-38755 | 2/2006 |
| JP | A-2008-298543 | 12/2008 |

OTHER PUBLICATIONS

Nov. 12, 2013 Notice of Rejection issued in Japanese Application No. 2010-036989 with partial English-language translation.

* cited by examiner

*Primary Examiner* — Matthew M Barker
(74) *Attorney, Agent, or Firm* — Oliff & Berridge, PLC

(57) ABSTRACT

A vehicle mounted radar device operable to scan a transmission wave to detect a detection point representing a position of an object disposed around the vehicle on the basis of a reflected wave of the transmission wave from the object. The radar device includes a reading unit, a continuity determination unit, a setting unit, anti an object determination unit that are configured to prevent the radar device from erroneously determining different pieces of object information as a single object.

6 Claims, 11 Drawing Sheets

RADAR DEVICE, OBJECT DETECTION SYSTEM, AND OBJECT DETECTION METHOD

The disclosure of Japanese Patent Application No. 2010-036989 filed on Feb. 23, 2010, including specification, drawings and claims is incorporated herein by reference in its entirety.

BACKGROUND

The present invention relates to a technique for preventing a radar device from erroneously determining different pieces of object information as a single object.

In general, a radar device which is mounted in a vehicle continuously scans the periphery of the vehicle, when the same object has been detected multiple times, outputs object information (for example, the relative distance between the vehicle and the object, the relative speed, the lateral distance (angle), and the like) to a vehicle control section in accordance with the positional relationship between the object which has been detected multiple times and the host vehicle, and performs vehicle control (warning, brake, seat belt tightening, or the like).

In performing continuous scanning, with regard to a newly detected object, when the object is continuously detected a predetermined number of times or more, object information is output to the vehicle control section. That is, when the object is detected once only in scanning, object information is not output to the vehicle control section. When the object is detected multiple times, processing is performed in which changes in the positional relationship between the object and the host vehicle are calculated, and if the conditions for the output to the vehicle control section are satisfied, the object information of the target object is output to the vehicle control section.

The detection of an object is done on the basis of a signal which is received as a received wave by the radar device when a transmission wave from the radar device is reflected from the object. The radar device may receive a plurality of reflected waves from a single object. In this case, a signal processing section of the radar device sets a reflection point at the closest relative distance from the host vehicle as a representative detection point, and determines all of detection points within a predetermined distance range (coupling range) from the representative detection point as a single object. The object information is output from the radar device to the vehicle control section.

When a representative detection point which has been detected once is not detected in subsequent scanning, if there is a detection point second-closest to the host vehicle next to the representative detection point which has not been detected in current scanning, from among the detection points within the coupling range previously detected, the detection point is set as a new representative detection point, the coupling range is again set on the basis of the new representative detection point, and processing is performed assuming that the same object is continuously detected after previous scanning. JP-A-2006-38755 describes a technique related to the present invention.

However, when a coupling range is provided and a plurality of detection points are determined to be a single object, even though detection points of different objects fall within a single coupling range, it may be determined to be the detection points of a single object. For example, when a vehicle is traveling by closely following another vehicle, all reflection points of different vehicles may be determined as a single object.

For this reason, when a representative detection point which has been detected in past scanning is not detected in subsequent scanning, or when a detection point second-closest to the host vehicle next to the representative detection point which has not been detected, from among the detection points within the coupling range in past scanning is a detection point of another vehicle different from the vehicle which has previously been detected, the detection point of another vehicle may be erroneously set as a new representative detection point of the same vehicle which has previously been detected. In this case, the set representative detection point is intrinsically a detection point of a vehicle which is newly detected. In the vehicle control section to which object information is output, if an object is not detected as the same object multiple times, the object is not subjected to vehicle control, thus the object information of the representative detection point will not be subjected to vehicle control intrinsically. For this reason, the radar device erroneously recognizes different objects as a single object, such that the vehicle control section performs vehicle control on the basis of object information which is not intrinsically subjected to vehicle control, causing erroneous vehicle control.

SUMMARY

It is therefore an object of at least one embodiment of the present invention to provide a technique for preventing a radar device from erroneously determining different pieces of object information as a single object.

In order to achieve at least one of the above-described objects, according to a first aspect of the embodiments of the present invention, there is provided a radar device which is mounted on a vehicle and is operable to scan a transmission wave to detect a detection point representing a position of an object disposed around the vehicle on the basis of a reflected wave of the transmission wave from the object, the radar device comprising: a reading unit that reads information of detection points from a memory which stores the information of the detection points including a first representative detection point closest to the vehicle, which are detected in first scanning; a continuity determination unit that determines whether or not the detection points of the read information are continuously detected in second scanning after the first scanning; a setting unit that sets one of the detection points second-closest to the vehicle next to the first representative detection point from among detection points disposed within a predetermined range from the first representative detection point in the first scanning as a second representative detection point in the second scanning when the first representative detection point is not detected in the second scanning; and an object determination unit that determines the first representative detection point and the second representative detection point are information of different objects when the second representative detection point exists at a position distant from a position of the first representative detection point by equal to or more than a predetermined distance.

According to the first aspect, when the second representative detection point exists at a position distant from the position of the first representative detection point by equal to or more than a predetermined distance, it is determined that the first representative detection point and the second representative detection point are information of different objects. Therefore, it is possible to prevent different objects from being erroneously determined as a single object.

In the radar device according to the first aspect of the embodiments of the present invention, the object determination unit may determine that the first representative detection point and the second representative detection point are information of an object when the second representative detection point exists at a position distant from the position of the first representative detection point by less than the predetermined distance.

With this configuration, when the second representative detection point exists at a position distant from the position of the first representative detection point by less than a predetermined distance, it is determined that the first representative detection point and the second representative detection point are information of the same object. Therefore, it is possible to correctly determine the same object as a single object.

In the radar device according to the first aspect of the embodiments of the present invention, the object determination unit may determine that the first representative detection point and the second representative detection point are information of an object when the second representative detection point exists at a position close to the vehicle from the position of the first representative detection point.

With this configuration, when the second representative detection point exists at a position close to the vehicle from the position of the first representative detection point, it is determined that the first representative detection point and the second representative detection point are information of the same object. Therefore, when a detection point which is newly detected is a detection point from the same object which has not been detected in past scanning, it is possible to correctly recognize the same object as a single object.

The radar device described above may further comprising an information transmission unit that, when a comparison result of a position of the first representative detection point and a position of the second representative detection point satisfies a predetermined condition, in a case where the object determination unit determines that the first representative detection point and the second representative detection point are information of an object, transmits information of the object to a control device that controls the vehicle.

With this configuration, when the comparison result of the positions of the first representative detection point and the second representative detection point which are determined to be the same object by the object determination unit satisfies a predetermined condition, the information of the object is transmitted to the control device which controls the vehicle. Therefore, it is possible to prevent erroneous control of the vehicle when different objects are erroneously determined as a single object, and the positions of the representative detection points satisfy a predetermined condition.

The information transmission unit, when the position of the second representative detection point is closer to the vehicle in a lateral direction than the position of the first representative detection point, in the case where the object determination unit determines that the first representative detection point and the second representative detection point are information of the object, may transmit the information of the object to the control device.

With this configuration, at the first representative detection point and the second representative detection point which are determined to be the same object, when the position of the second representative detection point is closer to the vehicle in the lateral direction than the position of the first representative detection point, the information transmission unit transmits the information of the object to the control device. Therefore, it is possible to prevent erroneous vehicle control when different objects are erroneously determined as a single object and it is determined that the vehicle is close to the object.

According to a second aspect of the embodiments of the present invention, there is provided a object detection system, comprising: the radar device described above; and a control device that controls the vehicle on the basis of the information of the object, transmitted from the information transmission unit of the radar device.

According to a third aspect of the embodiments of the present invention, there is provided an object detection method which scans a transmission wave to detect a detection point representing a position of an object disposed around the vehicle on the basis of a reflected wave of the transmission wave from the object, and detects information of the object on the basis of the detection point, the object detection method comprising: reading information of detection points from a memory which stores the information of the detection points including a first representative detection point closest to the vehicle, which are detected in first scanning; determining whether or not the detection points of the read information are continuously detected in second scanning after the first scanning; setting one of the detection points second-closest to the vehicle next to the first representative detection point from among detection points disposed within a predetermined range from the first representative detection point in the first scanning as a second representative detection point in the second scanning when the first representative detection point is not detected in the second scanning; and determining the first representative detection point and the second representative detection point are information of different objects when the second representative detection point exists at a position distant from a position of the first representative detection point by equal to or more than a predetermined distance.

According to the second and third aspects, when the second representative detection point exists at a position distant from the position of the first representative detection point by equal to or more than a predetermined distance, it is determined that the first representative detection point and the second representative detection point are information of different objects. Therefore, it is possible to prevent different objects from being erroneously determined as a single object.

DETAILED DESCRIPTION OF THE EMBODIMENTS

<1. Configuration>

Figure 1:
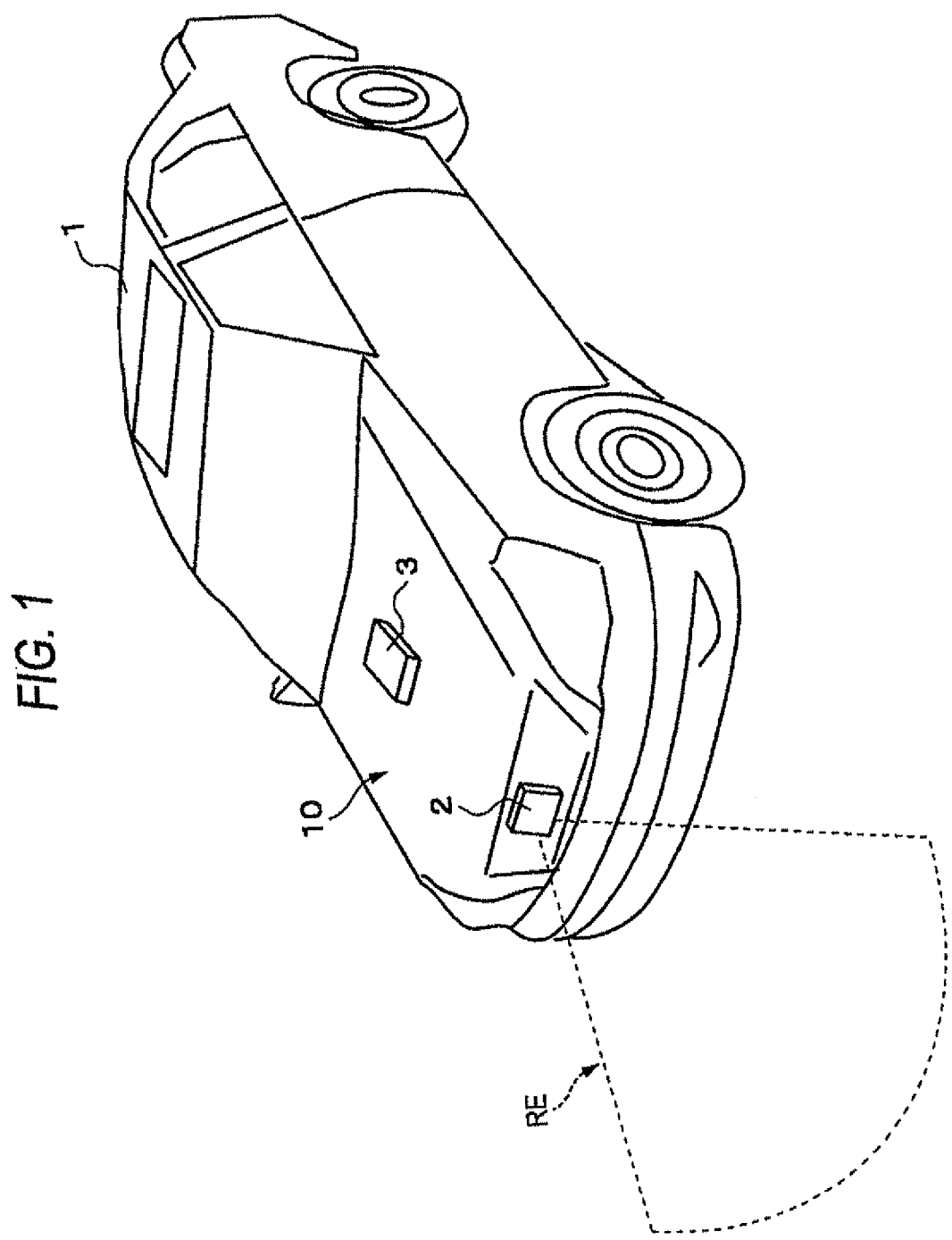
FIG. 1 is an overall view of a vehicle.

FIG. 1 is an overall view of a vehicle 1. In the vehicle 1, an object detection system 10 of this embodiment includes a radar device 2 and a vehicle control section 3. The radar device 2 is provided in the front portion of the vehicle. The radar device 2 scans a detection range RE to calculate the relative distance between the vehicle 1 and an object and the relative speed and to calculate the lateral distance (angle) of an object when viewed from the vehicle 1. The mounting position of the radar device 2 is not limited to the front portion of the vehicle, and may be the rear portion or the lateral portion of the vehicle 1.

The vehicle control section 3 performs vehicle control of the vehicle 1 in accordance with the detection result of an object of the radar device 2. Examples of vehicle control include acceleration control or brake control when the vehicle is traveling by following a preceding vehicle, and brake control for collision prevention. A passenger being fastened in a seat by a seat belt is prepared for a time of collision, or a headrest is fixed such that at the time of collision injury to the body of a passenger is reduced.

Figure 2:
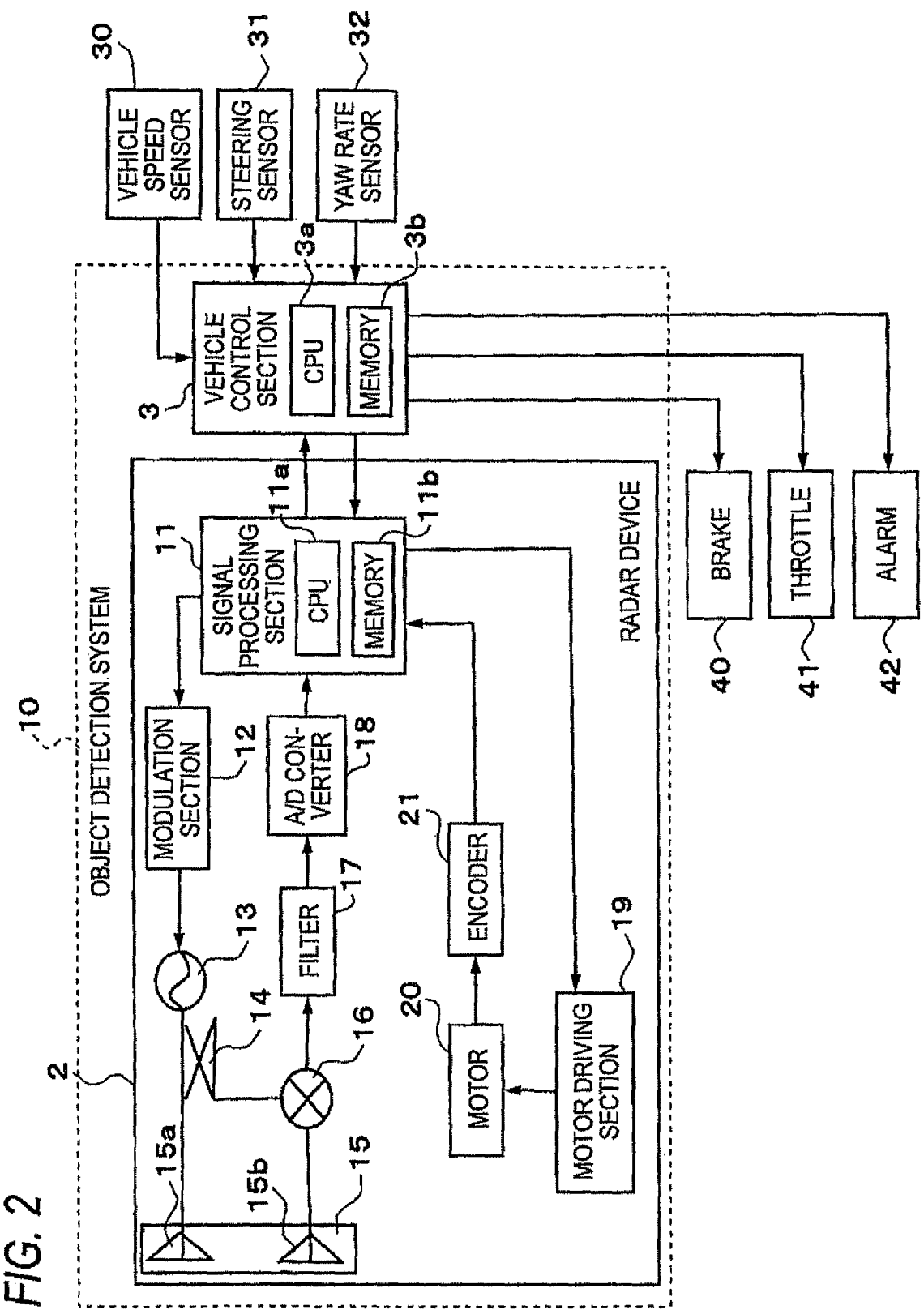
FIG. 2 is a block diagram of an object detection system.

FIG. 2 is a block diagram of the object detection system 10. The object detection system 10 is configured such that the radar device 2 and the vehicle control section 3 are electrically connected to each other. The vehicle control section 3 of the object detection system 10 is electrically connected to various sensors provided in the vehicle 1, such as a vehicle speed sensor 30, a steering sensor 31, and a yaw rate sensor 32. The vehicle control section 3 is also electrically connected to various devices, such as a brake 40, a throttle 41, and an alarm 42, which are provided in the vehicle 1.

The radar device 2 includes a signal processing section 11, a modulation section 12, a VCO (Voltage Controlled Oscillation) 13, a directional coupler 14, a planer antenna 15, a mixer 16, a filter 17, an A/D (analog-to-digital) converter 18, a motor driving section 19, a motor 20, and an encoder 21. The planar antenna 15 has a transmitting antenna 15a and a receiving antenna 15b. Although in the following embodiment, a case will be described where the antenna scanning method of the radar device 2 is a mechanical scanning method in which an antenna is driven in a predetermined direction, the invention may be applied to an electronic scanning method in which DBF (Digital Beam Forming) or the like is used in estimating the direction of an object without driving an antenna.

With regard to object detection by the radar device 2, the modulation section 12 generates a modulated signal in a frequency band set in advance on the basis of a signal from the signal processing section 11. The modulated signal is converted to a transmission signal by the VCO 13 and output as a transmission wave from the transmitting antenna 15a of the planar antenna 15 through the directional coupler 14.

The transmission wave output from the planar antenna 15 is reflected from an object and received as a reflected wave by the planar antenna 15. The received reflected wave and an oscillation signal are mixed by the mixer 16 through the directional coupler 14.

A received signal mixed with the transmission signal is a beat signal including information of the relative distance from the object or the relative speed. The beat signal is filtered by the filter 17, such that a beat signal in a band including information of the relative distance between the vehicle 1 having the radar device 2 and the object or the relative speed is detected.

The beat signal which is filtered in a predetermined frequency band by the filter 17 is converted from an analog signal to a digital signal by the A/D converter 18 and then input to the signal processing section 11.

The radar device 2 moves the planar antenna 15 within a predetermined angle range to scan transmission waves. When the radar device 2 is provided in the front bumper portion of the vehicle 1 and a preceding vehicle is located directly in front of the vehicle 1, if the planar antenna 15 is at a position perpendicular to the preceding vehicle, the angle of the planar antenna 15 is set to 0 degrees. For example, the planar antenna 15 carries out scanning by 15 degrees left and right from the state of 0 degrees. The state where the angle is 0 degrees refers to a case where the lateral distance between the vehicle 1 and the preceding vehicle is 0 m. The scanning of the planar antenna 15 is carried out by the motor driving section 19 and the motor 20, information of the number of passages through a slit (not shown) of the encoder 21 and the passage direction according to the scanning of the planar antenna 15 is output to the signal processing section 11.

The signal processing section 11 includes a CPU 11a which controls the respective sections of the radar device 2 and performs information processing when data is transmitted and received to and from the vehicle control section 3, and a memory 11b which stores a program to be used for processing in the CPU 11a. Various functions of the CPU 11a are realized by executing the program. The relative distance between the vehicle 1 and an object or the relative speed is detected on the basis of a signal output from the A/D converter 18. The lateral distance (angle) between the vehicle 1 and the object is detected on the basis of information output from the encoder 21. In this way, these are detected as the parameter values of object information.

Although a case has been described where the memory 11b of the signal processing section 11 is provided inside the signal processing section 11, the memory 11b is not limited as being provided inside the signal processing section 11 and may be provided inside the radar device 2 or outside the radar device 2.

In this embodiment, information of an object detected by the radar device 2 is referred to as object information, and as the parameter values of the object information, there are the relative distance, the relative speed, and the lateral distance (angle) of an object when viewed from the vehicle 1. The memory 11b of the signal processing section 11 also stores multiple pieces of data, such as object information detected through past object detection processing.

The vehicle control section 3 which is electrically connected to the signal processing section 11 includes a CPU 3a and a memory 3b. The CPU 3a controls the respective sections of the vehicle 1 and performs information processing when data is transmitted and received to and from the signal processing section 11. The memory 3b stores a program to be used for processing in the CPU 3a and also stores object information transmitted from the signal processing section 11. Various functions of the CPU 3a are realized by executing the program.

Although a case has been described where the memory 3b of the vehicle control section 3 is provided inside the vehicle control section 3, the memory 3b is not limited as being provided inside the vehicle control section 3 and may be provided outside the vehicle control section 3.

The brake 40, the throttle 41, and the alarm 42 are electrically connected to the vehicle control section 3. The vehicle control section 3 controls the brake 40, the throttle 41, and the alarm 42 in accordance with object information, such that the operation of the vehicle 1 is controlled. For example, when the vehicle 1 comes close to an object, the alarm 42 issues a warning to notify an abnormality to a driver as a user. When the vehicle 1 is likely to collide against an object, the brake 40 is operated to reduce the speed of the vehicle 1, or the throttle 41 is narrowed to reduce the number of rotations of the engine.

To the vehicle control section 3 are also connected the vehicle speed sensor 30 which detects the speed of the vehicle 1, the steering sensor 31 which detects the steering angle of the steering wheel, and the yaw rate sensor 32 which detects the turning speed of the vehicle 1. With the use of both the steering sensor 31 and the yaw rate sensor 32, it becomes possible to detect the turning direction of the vehicle 1 and the turning speed of the vehicle 1 according to steering manipulation. For this reason, it is preferable that both sensors are provided, but either the steering sensor 31 or the yaw rate sensor 32 may be used to detect the turning direction of the vehicle 1.

The transmission waves and the received waves which are transmitted and received by the planar antenna 15 may be signals, such as electric waves, laser, or ultrasonic waves. Any signal may be used insofar as the signal is transmitted from the planar antenna 15, reflected from an object, and received as a reflected wave, detecting object information.

Although in this embodiment, an antenna is the planar antenna 15, in addition to the planar antenna 15, a lens antenna, a reflecting mirror antenna, or the like may be used insofar as the antenna can output a transmission wave and receive a reflected wave of the transmission wave from the object. Although a case has been described where the transmitting antenna 15a and the receiving antenna 15b are provided separately, a transmission/reception antenna may be used such that a single antenna can carry out both transmission and reception.

Next, as an example of signal processing which is used for object detection processing, an FM-CW (Frequency Modulated Continuous Wave) method will be described. Although in this embodiment, the FM-CW method will be described as an example, the signal processing method is not limited to the FM-CW method and any method may be used insofar as object information is calculated in a combination of a plurality of periods including an up period and a down period.

Figure 3:
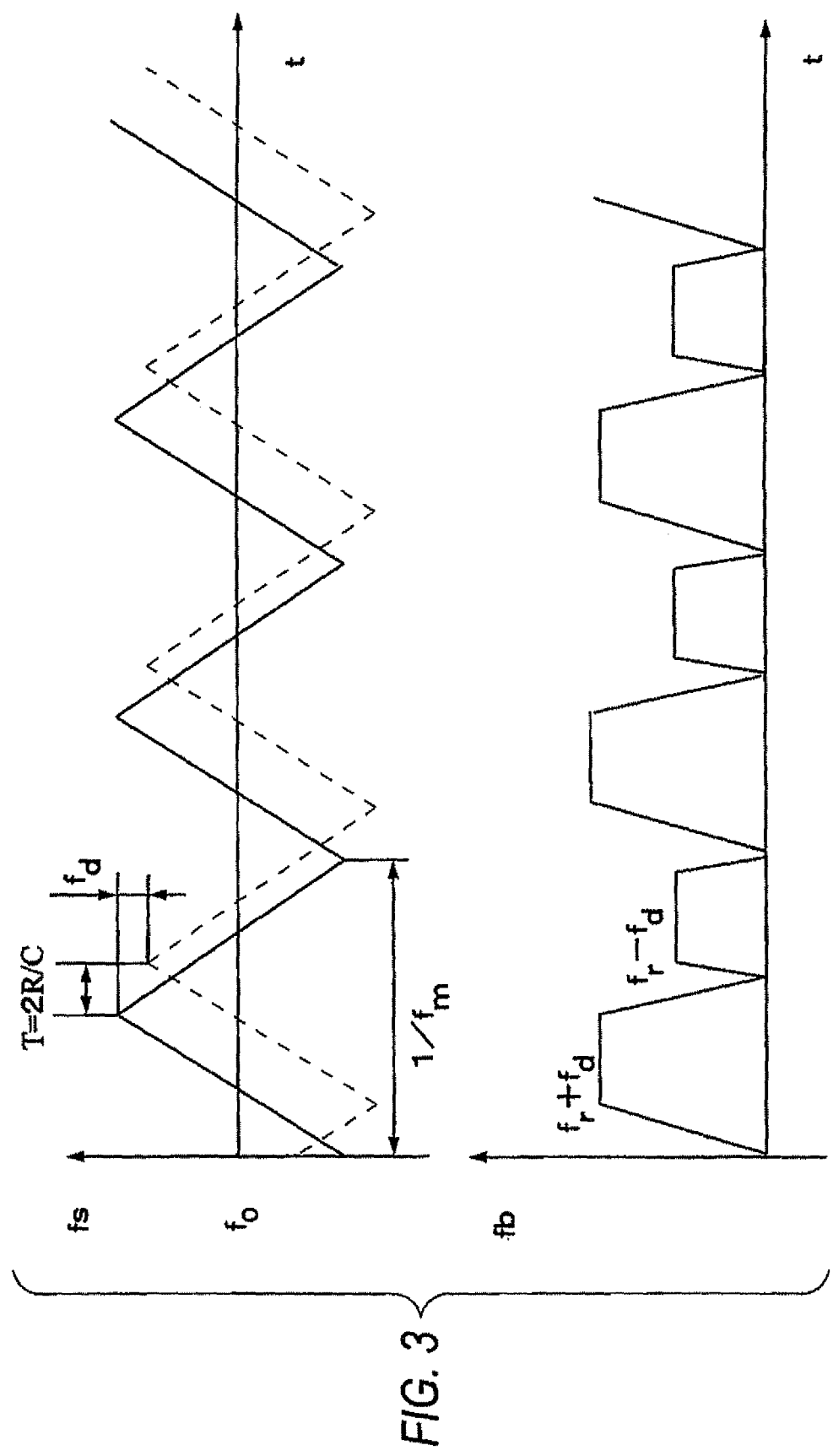
FIG. 3 is a diagram showing an FM-CW signal and a beat signal.

The symbols for an FM-CW signal and a beat signal in the following expression or in FIG. 3 are denoted as follows: fb: beat frequency, fs: frequency, fr: distance frequency, fd: speed frequency, f0: center frequency of transmission wave, $\Delta f$: frequency shift width, fm: repetition frequency of modulated wave, C: light speed (speed of electric wave), T: reciprocation time of electric wave to object, R: distance to object, and v: relative speed to object.

An upper view of FIG. 3 is a diagram showing the signal waveforms of an FM-CW transmission signal and a received signal. A lower view of FIG. 3 is a diagram showing a beat frequency which is generated by a differential frequency between a transmission signal and a received signal. In the upper view of FIG. 3, the horizontal axis represents time and the vertical axis represents frequency. In the drawing, a transmission signal indicated by a solid line has the nature that the frequency changes in a predetermined cycle. The transmission signal has an up period in which the frequency rises and a down period in which the frequency rises to a predetermined frequency and then falls to a predetermined frequency. The transmission signal repeatedly undergoes a predetermined change such that the frequency rises to a predetermined frequency, falls to a predetermined frequency, and again rises to a predetermined frequency. The transmission signal is reflected from an object and received, and becomes a received signal indicated by a broken line in the drawing. Similarly to the transmission signal, the received signal has a down period and an up period. As a frequency band which is used in this embodiment, a frequency in a band of 76 Ghz is exemplified.

The received signal has a temporal delay (T=2R/C) depending on the distance between the vehicle 1 and the object compared to the transmission signal. When there is a difference in speed between the vehicle 1 and an object, the received signal is shifted in parallel to the axis of the frequency fs compared to the transmission signal. The Doppler shift amount becomes fd.

In the lower view of FIG. 3 in which the horizontal axis represents time and the vertical axis represents beat frequency, the beat frequency is calculated by Expression (1).

$$fb = fr \pm fd = (4 \cdot \Delta f \cdot fm/C)R + (2 \cdot f0/C)v \tag{1}$$

The beat signal expressed by Expression (1) is subjected to FFT processing described below, such that a frequency spectrum is detected. Within the detected frequency spectrum, a frequency spectrum which exceeds a predetermined threshold value is detected as a peak signal, and processing described below is performed for the peak signal. Thus, the relative distance between the vehicle 1 and an object, the relative speed, and the lateral distance (angle) from an object are calculated.

<2. Operation>

<2-1. Object Information Output Processing>

Figure 4:
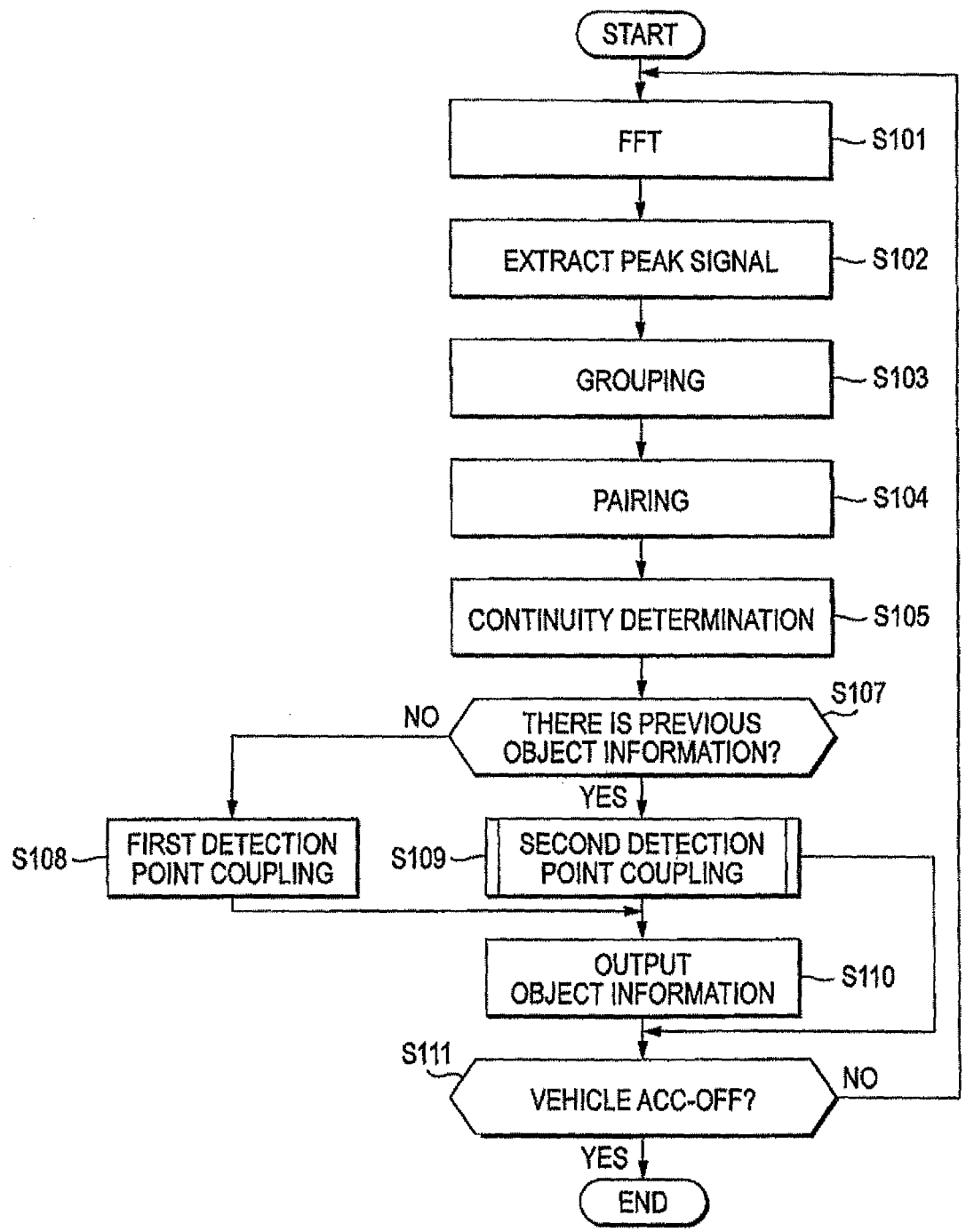
FIG. 4 is a flowchart of object detection processing.

FIG. 4 is a flowchart of object detection processing. This processing is repeatedly performed each time scanning in front of the vehicle is completed. A beat signal which is generated by mixing a transmission signal and a received signal is A/D converted by the A/D converter (analog-to-digital converter) 18 and loaded on the signal processing section 11, such as a microcomputer. The signal processing section 11 performs FFT (Fast Fourier Transform) processing for the beat signal (Step S101).

The beat signal subjected to the FFT processing is detected as a frequency spectrum. In general, the frequency spectrum of an object has a relative power level greater than a frequency spectrum, such as noise. Thus, a frequency spectrum which exceeds a threshold value at a predetermined power level is extracted as a peak signal (Step S102).

With regard to the peak signal which is extracted for each angle of the antenna, a plurality of peak signals are grouped as a single group on the basis of information of the speed of the vehicle 1, the signal intensity of the peak signal, and the angle of the peak signal (Step S103). As a result, a plurality of groups each including a plurality of peak signals are generated in each of the up period and the down period. The grouping processing is performed such that received signals which are received in a predetermined reflection range of an object are detected as a plurality of peak signals at each of the continuous angles of the object, a plurality of peak signals in a predetermined angle range at each of the continuous angles are grouped as a single group, and this group is set as a single reflection point.

The peak signals in a plurality of groups which are generated in the up period and a plurality of groups which are generated in the down period are paired on the basis of information of the speed of the vehicle 1, the signal intensity of the grouped peak signals, and the angle of the grouped peak signals (Step S104). Through the pairing processing, a reflection point from a single object is determined as a detection point.

Continuity determination is performed to determine whether or not a detection point which is the same as a detection point, which has been detected in past scanning, is continuously detected in current scanning (Step S105). As an example of determination, from object information of a past detection point stored in the memory 11b and speed information of the vehicle 1 from the vehicle speed sensor 30, it can be predicted in advance at which position in a current scanning range a detection point in past scanning will be detected. If there is a detection point within the predicted range, it is determined that the detection point which has been detected in the past is continuously detected in current scanning.

If the continuity determination is performed, the signal processing section 11 increases the count of the number of times of continuity by +1 for a detection point which is determined as being continuously detected, and applies only a detection point, which has been determined to have multiple-times (for example, three-times) continuity, to subsequent processing after Step S107. In Step S107, it is determined whether or not object information of detection point coupling processing described below in past (for example, previous) scanning is stored in the memory 11b (Step S107).

When object information based on detection point coupling processing in past scanning is not stored in the memory 11b (No in Step S107), first detection point coupling processing of Step S108 is performed. When object information based on detection point coupling processing of past scanning is stored in the memory 11b (Yes in Step S107), second detection point coupling processing of Step S109 is performed.

In Step S105, a detection point which is determined to be not continuously detected, for example, a detection point which is newly detected is continuously detected in subsequent scanning and will be thus subjected to processing after Step S107.

The detection point coupling processing of Step S108 or S109 is mainly performed such that, as described above, a detection point at the closest distance from the vehicle 1 from among detection points, which are determined in multiple-times scanning to have multiple-times continuity, is set as a representative detection point, and detection points which fall within a predetermined range (within a coupling range) substantially centered on the representative detection point are coupled as a single object. Specifically, processing is performed in which detection points based on a plurality of reflection points from one of mobile objects, such as an automobile, a truck, and a motorcycle, or stationary objects, such as a guardrail and a railroad bridge, are coupled as single object information. The first detection point coupling processing and second detection point coupling processing will be described below.

After the first detection point coupling (Step S108) or the second detection point coupling (Step S109), object information in which detection points are coupled is output to the vehicle control section 3 (Step S110). The vehicle control section 3 performs vehicle control, such as manipulation of the brake 40, manipulation of the throttle 41, and manipulation of the alarm 42, on the basis of the output object information.

After the object information is output in Step S110, when the ACC of the vehicle 1 is not in the OFF state (No in Step S111), the process returns to the initial step (Step S101) and the object detection processing based on subsequent scanning is repeatedly performed. When the ACC of the vehicle 1 is in the OFF state, the object detection processing ends.

In the second detection point coupling processing, if predetermined determination described below is made (No in Step S305 of FIG. 7), Step S110 is not performed and the process progresses to Step S111.

<2-2. First Detection Point Coupling>

Figure 5:
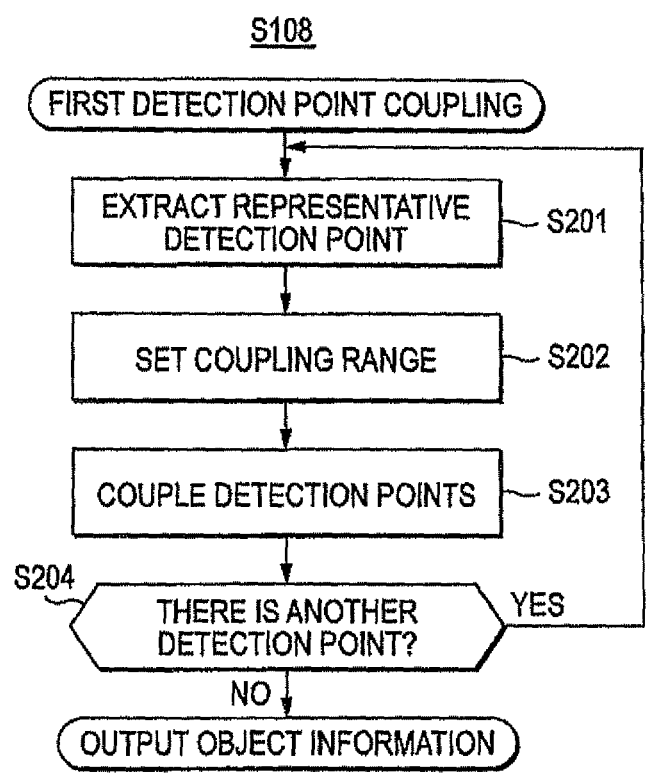
FIG. 5 is a flowchart of detection point coupling processing of object information which is output in accordance with first detection point coupling processing.

Next, the first detection point coupling processing in the signal processing section 11 will be described in detail. FIG. 5 is a flowchart showing detection point coupling processing of object information, which is output to the vehicle control section 3 in accordance with the first detection point coupling processing, at the time of the first detection point coupling processing in FIG. 4. That is, FIG. 5 is a flowchart illustrating processing which is performed when object information with detection points coupled in past (for example, previous) detection point coupling processing is not stored in the memory 11b.

Figure 6:
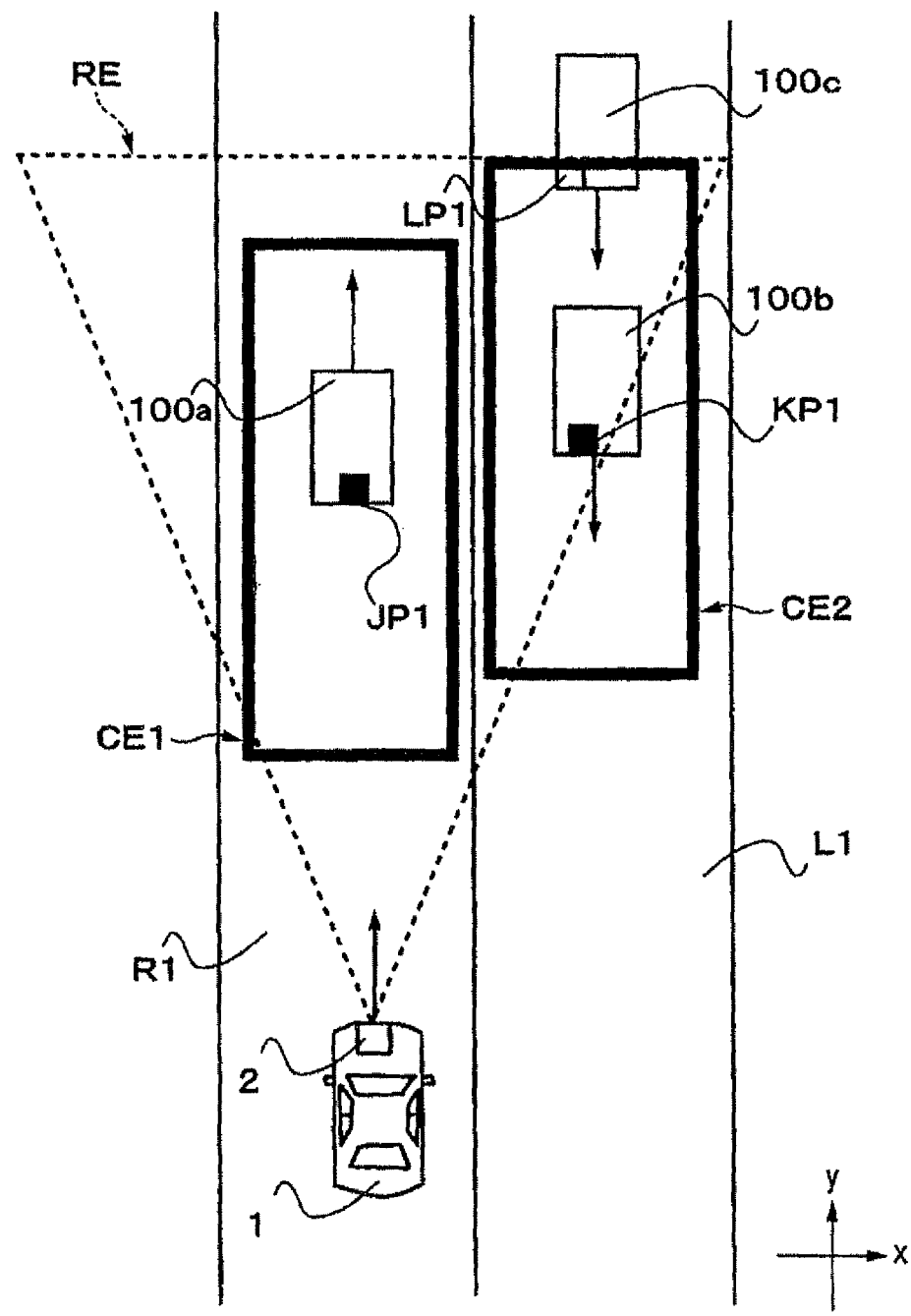
FIG. 6 is a diagram illustrating a specific example of detection point coupling processing of object information which is output in accordance with first detection point coupling processing.

FIG. 6 is a diagram illustrating a specific example of detection point coupling processing of object information which is output to the vehicle control section 3 in accordance with the first detection point coupling processing. The xy coordinate axes shown in FIG. 6 or later are relatively fixed with respect to the vehicle 1. The lateral direction of the vehicle 1 corresponds to the x-axis direction and the longitudinal direction (traveling direction) of the vehicle 1 corresponds to the y-axis direction.

As the result of Step S106 of FIG. 4, as shown in FIG. 6, as the detection points having multiple-times continuity, a detection point JP1 of a vehicle 100a on a road R1 on which the vehicle 1 is traveling, a detection point KP1 of a vehicle 100b on the road L1 in the lateral direction (+x-axis direction) of the vehicle 1, and a detection point LP1 of a vehicle 100c are detected. These detection points fall within the detection range RE of the radar device 2 of the vehicle 1.

In the first detection point coupling, first, representative detection point extraction shown in FIG. 5 from a plurality of detection points is performed (Step S201). In the representative detection point extraction, a detection point at the closest relative distance from the vehicle 1 is extracted from a plurality of detection points JP1, KP1, and LP1. In FIG. 6, the detection point JP1 is extracted as a representative detection point.

Next, the coupling range of object information is set on the basis of the extracted representative detection point (Step S202). As shown in FIG. 6, a coupling range CE1 is set within a predetermined range substantially centered on the representative detection point JP1. The detection points which fall within the coupling range CE1 are coupled as single object information (Step S203). In FIG. 6, the detection points within the coupling range CE1 include only the representative detection point JP1. Thus, the position or the like of the representative detection point JP1 is output to the vehicle control section 3 as object information of a single object.

The coupling range CE1 has a shape in which all the detection points as the reflection points from a single vehicle are included, and has a rectangular shape shown in FIG. 6 which has the sides in the x-axis direction and the y-axis direction. The coupling range CE1 may have a polygonal shape, instead of the rectangular shape, insofar as all the detection points as the reflection points from a single vehicle are included.

Next, it is determined whether or not there is a detection point other than the coupled detection point JP1 from among the detection points detected within the detection range RE (Step S204). As the result of determination, when there is another detection point (Yes in Step S204), the representative detection point extraction starts for the remaining detection points which are not coupled in the previous coupling processing (Step S201). When there is no another detection point which is not coupled (No in Step S204), the coupled object information is output to the vehicle control section 3 as information of a single object.

In FIG. 6, there are the detection point KP1 of the vehicle 100b and the detection point LP1 of the vehicle 100c other than the representative detection point JP1 which is coupled in the previous coupling processing. For this reason, it is determined in Step S204 of FIG. 5 that there is another detection point (Yes in Step S204), and the representative detection point extraction (Step S201) is again performed. A detection point at the closest relative distance from the vehicle 1 other than the coupled detection point is the detection point KP1 of the vehicle 100b. Thus, the detection point KP1 is extracted as a representative detection point (Step S201).

A coupling range CE2 substantially centered on the representative detection point KP1 is set (Step S202). The representative detection point KP1 and the detection point LP1 fall within the coupling range CE2. For this reason, the representative detection point KP1 and the detection point LP1 are coupled as a single object (Step S203). The object information of the coupling range CE1 and the object information of the coupling range CE2 which are coupled on the basis of the representative detection point are determined to be different pieces of object information.

Although the coupling range CE2 is intrinsically set to couple the detection points as the reflection points from a single vehicle, as described above, when the detection point KP1 of the single vehicle 100b is close to the detection point LP1 of another vehicle 100c, the detection points of different vehicles may be coupled as the detection points of a single vehicle.

After the detection point coupling, in FIG. 6, there is no another detection point (No in Step S204). Thus, in Step S110 of FIG. 4, the object information is output to the vehicle control section 3, and the object information representing the representative detection point and the detection points coupled to the representative detection point is stored in the memory 11b.

<2-3. Second Detection Point Coupling>

Figure 7:
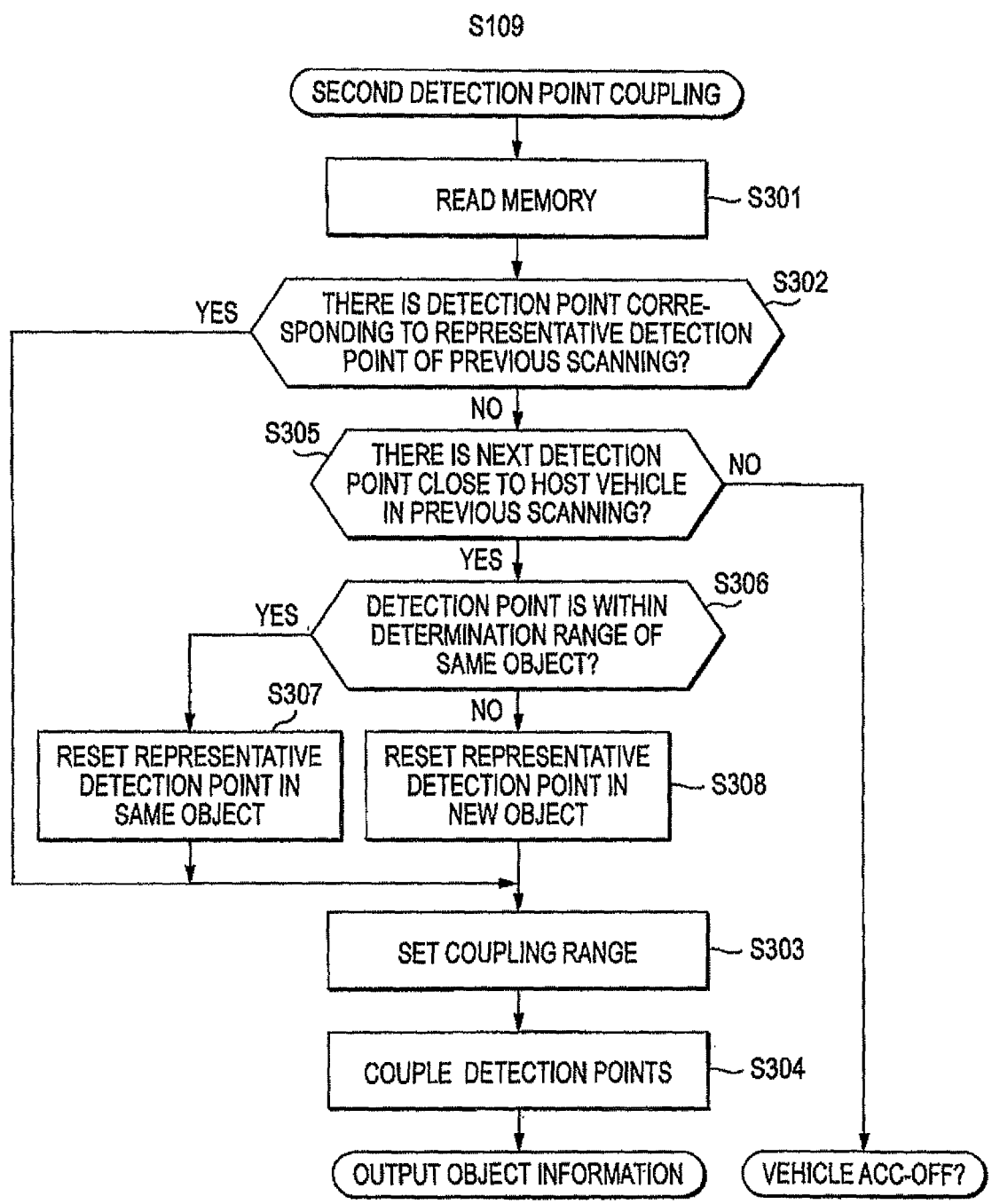
FIG. 7 is a flowchart showing detection point coupling processing of object information which is output in accordance with second detection point coupling processing.

Next, the second detection point coupling processing in the signal processing section 11 will be described. FIG. 7 is a flowchart showing detection point coupling processing of object information which is output in accordance with the second detection point coupling processing. In describing the processing of FIG. 7, FIG. 8 which is a diagram illustrating representative detection point resetting processing in the same object and FIG. 9 which is a diagram showing determination of the same object within a coupling range are used. In describing the processing of FIG. 7, FIG. 10 which is a diagram illustrating representative detection point resetting processing in a new object and FIG. 11 which is a diagram showing determination of a new object within a coupling range are used.

First, the signal processing section 11 reads object information from the memory 11b which stores object information of past scanning (Step S301). When a detection point corresponding to a representative detection point in past scanning (for example, previous scanning) exists in current scanning (Yes in Step S302), as described with reference to FIG. 6, the detection point corresponding to the representative detection point is set as a representative detection point in current scanning, a coupling range is set within a predetermined range substantially centered on the representative detection point (Step S303), and the detection points which fall within the coupling range are coupled as single object information (Step S304). The position or the like of the representative detection point is output to the vehicle control section 3 as object information of a single object.

Returning to Step S302, when a detection point corresponding to a representative detection point in past scanning does not exist in current scanning (No in Step S302), it is determined whether or not there is a detection point at a close relative distance from the vehicle 1 next to the representative detection point in past scanning (Step S305). When there is a detection point at a close relative distance from the vehicle 1 next to the representative detection point (Yes in Step S305), it is determined whether or not the detection point exists within the same object determination range in past scanning (Step S306).

Processing related to the same object determination range will be described with reference to FIGS. 8 and 9. In Step S305, when there is no detection point close to the host vehicle next to the representative detection point in past scanning (No in Step S305), the processing ends and progresses to Step S111 of FIG. 4 to determine the state of the ACC of the vehicle 1.

Figure 8:
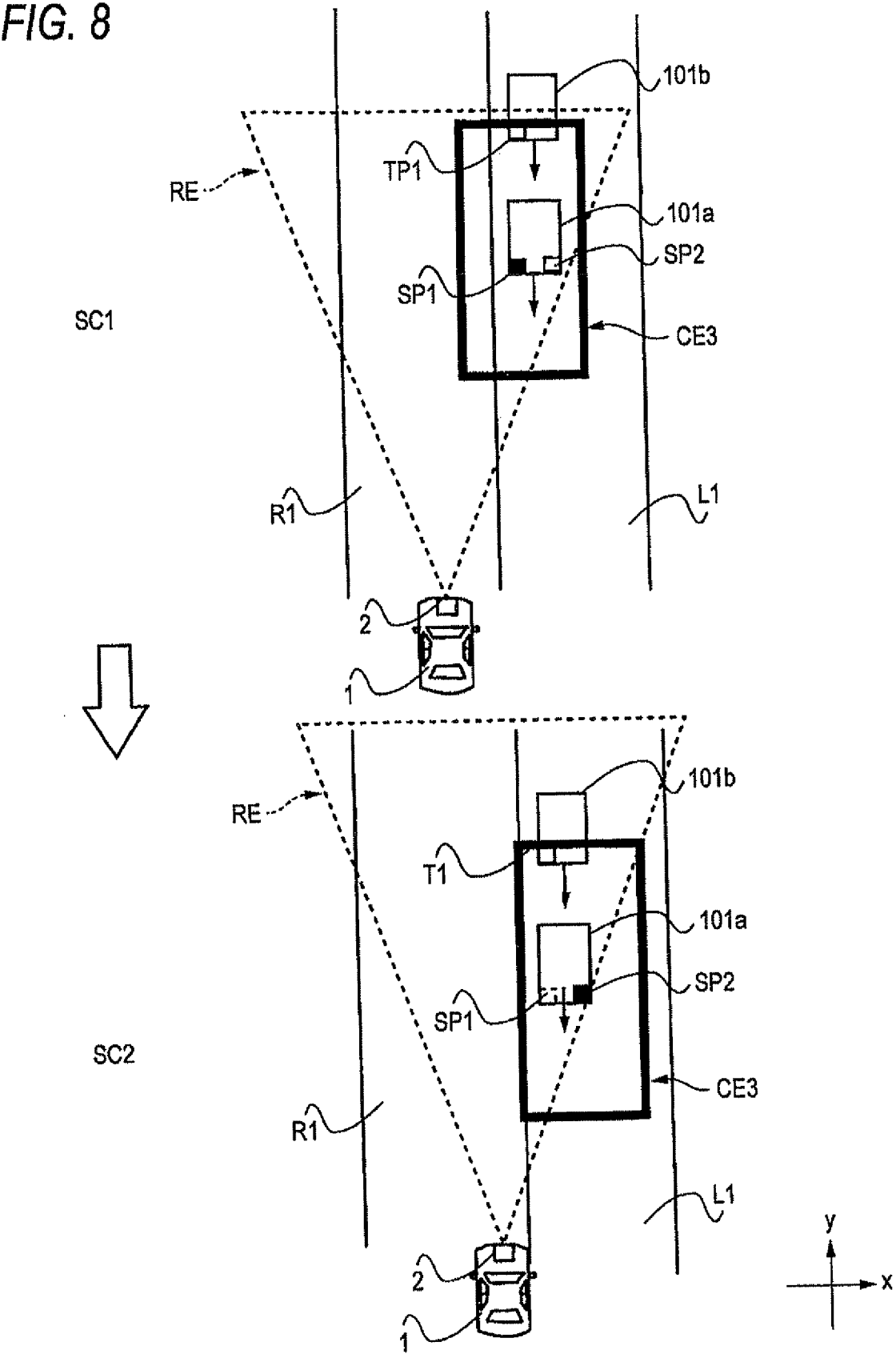
FIG. 8 is a diagram illustrating representative detection point resetting processing in the same object.

Scanning SC1 on the upper side of FIG. 8 represents object information which has been detected in past scanning. In this case, the vehicle 1 having the radar device 2 is going straight through a road R1 (is traveling in the +y direction). Within a scanning range RE of the vehicle 1, a detection point SP1 and a detection point SP2 of a vehicle 101a which is traveling on the road L1 in a direction (−y direction) toward the vehicle 1 and a detection point TP1 of a vehicle 101b in a direction (−y direction) toward the vehicle 1 fall within a coupling range CE3. Within the coupling range CE3, the detection point SP1 at the closest relative distance from the vehicle 1 is substantially at the center and becomes a representative detection point.

In subsequent scanning SC2, the representative detection point SP1 which has been detected in the scanning SC1 is not detected. Thus, within the coupling range CE3 of the previous scanning SC1, the detection point SP2 at a close relative distance from the vehicle 1 next to the representative detection point SP1 is set as a new representative detection point in the scanning SC2.

A coupling range CE3 centered on the new representative detection point SP2 is set, the representative detection point SP2 and the detection point T1 within the coupling range CE3 are coupled as a single object, and the position or the like of the representative detection point SP2 is output to the vehicle control section 3 as object information of a single object. The new representative detection point SP2 exists within the same object determination range described below in the past scanning SC1. Thus, it is determined to be the same object as the past object information. FIG. 9 shows this processing in detail.

Figure 9:
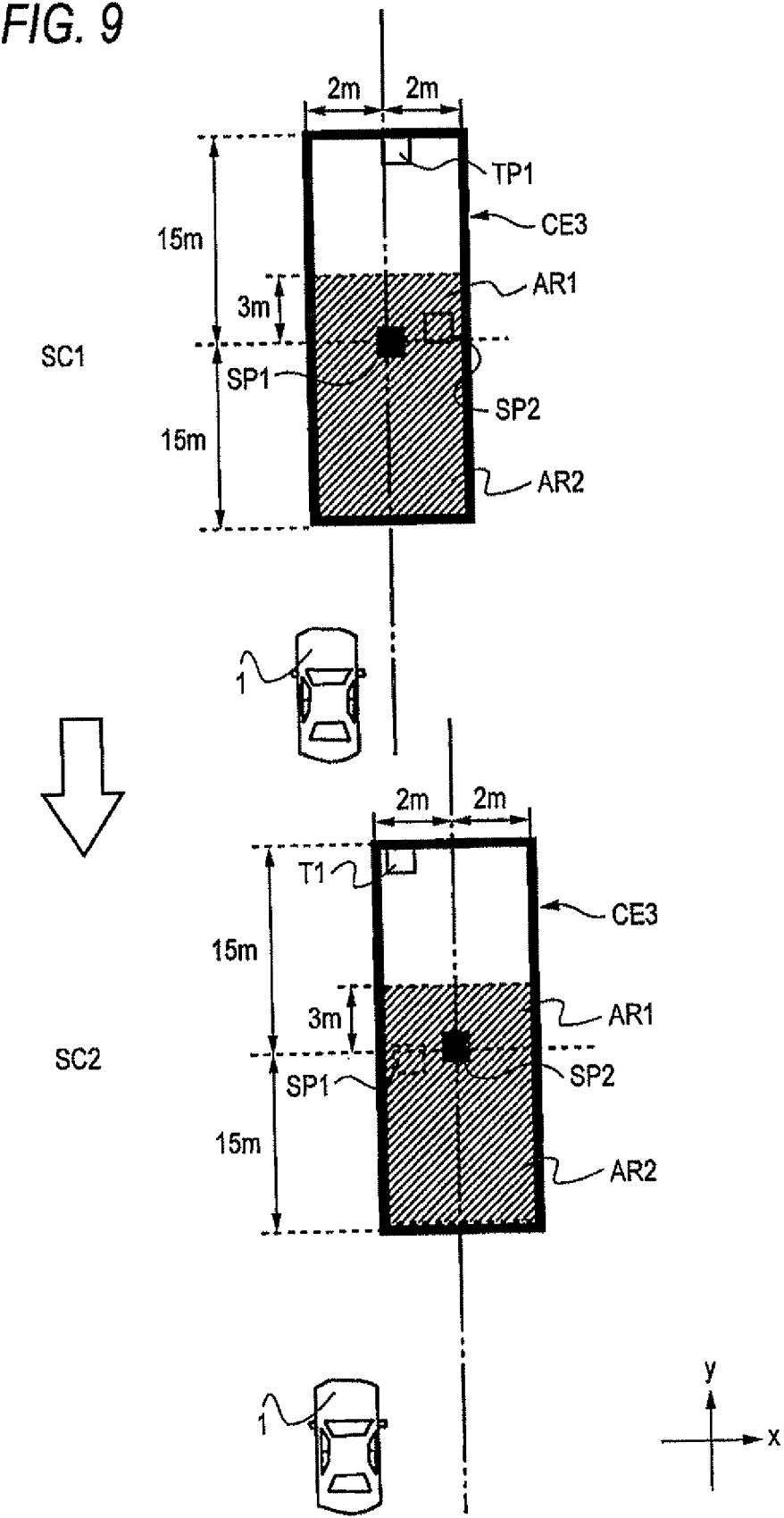
FIG. 9 is a diagram showing determination of the same object within a coupling range.

In scanning SC1 on the upper side of FIG. 9, a rectangular coupling range CE3 of 30 m vertically (y-axis) and 4 m horizontally (x-axis) substantially centered on the representative detection point SP1 is provided. A detection point SP2 exists in the lateral direction (+x direction) distant (+y direction) from the representative detection point SP1. In other words, the detection point SP2 exists at a position distant (+y direction) from the position of the representative detection point SP1 by less than a predetermined distance (for example, less than 3 m).

A detection point TP1 exists distant (+y direction) from the representative detection point SP1. In other words, the detection point TP1 exists at a position distant (+y direction) from the position of the representative detection point SP1 by equal to or more than a predetermined distance (for example, equal to or more than 3 m).

Within a coupling range in the lateral direction (2 m in the +x direction and 2 m in the −x direction) from the position of the representative detection point SP1, a range surrounded by a position (a position distant from the position of the representative detection point SP1 in the +y direction by 3 m) distant (+y direction) from the position of the representative detection point SP1 in the longitudinal direction (y-axis direction) by less than a predetermined distance (for example, less than 3 m) is set as a same object determination range AR1. Within a coupling range in the lateral direction from the position of the representative detection point SP1, a range surrounded by a position (a position distant from the position of the representative detection point SP1 in the −y direction by 15 m) close to the vehicle from the position of the representative detection point SP1 is set as a same object determination range AR2. The detection point SP2 of the scanning SC1 exists within the same object determination range AR1. A detection point which exists within the same object determination range in the scanning SC1 is determined as the detection point of the same object as the representative detection point SP1 in the scanning SC1 which has not been detected in the scanning SC2.

In the current scanning SC2, there is no representative detection point SP1 in the past scanning SC1. Thus, the detection point SP2 at a close relative distance from the vehicle 1 next to the representative detection point SP1 in past scanning becomes a new representative detection point in the scanning SC2. The new representative detection point exists within the same object determination range in past scanning. Thus, it is determined to be the same object as the representative detection point SP1.

In the scanning SC2, the coupling range CE3 of the same object as the past scanning SC1 based on the newly set representative detection point SP2 is set, and the representative detection point SP2 and the detection point T1 which exist within the coupling range are coupled to be a single object, and information of the position of the like of the representative detection point SP2 is output to the vehicle control section 3 as object information of a single object. Thus, the same object can be correctly determined as a single object.

Next, returning to Step S306 of FIG. 7, when there is no detection point within the same object determination range (No in Step S306), a detection point at a close relative distance from the vehicle 1 next to the representative detection point from among the detection points within the coupling range in past scanning and out of the same object determination range is reset as a new representative detection point (Step S308), a coupling range is set on the basis of the new representative detection point (Step S303), the detection points within the coupling range are coupled (Step S304), and information of the position or the like of the representative detection point is output to the vehicle control section 3 as new object information.

Figure 10:
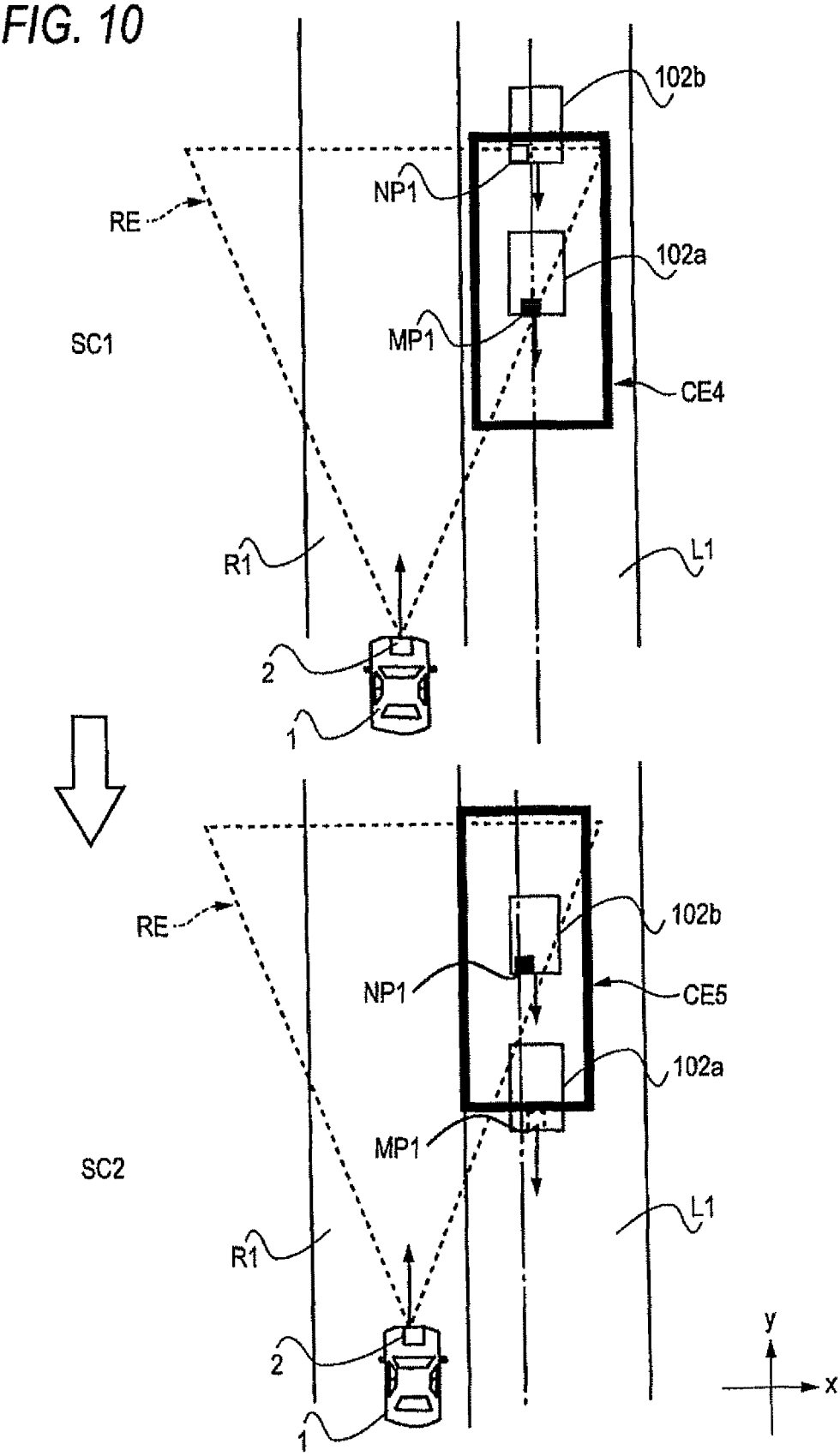
FIG. 10 is a diagram illustrating representative detection point resetting processing in a new object.

Scanning SC1 on the upper side of FIG. 10 represents object information which has been detected in past scanning. In this case, the vehicle 1 having the radar device 2 is going straight through a road R1 (is traveling in the +y direction). Within a scanning range RE of the vehicle 1, a detection point MP1 of a vehicle 102a which is traveling on the road L1 in a direction (−y direction) toward the vehicle 1 and a detection point NP1 of a vehicle 102b in a direction (−y direction) toward the vehicle 1 are within a coupling range CE4. Within the coupling range CE4, the detection point MP1 at the closest relative distance from the vehicle 1 is substantially at the center and becomes a representative detection point.

In subsequent scanning SC2, the representative detection point MP1 which has been detected in the scanning SC1 is not detected. Thus, within the coupling range CE4 of the previous scanning SC1, the detection point NP1 at a close relative distance from the vehicle 1 next to the representative detection point MP1 is set as a new representative detection point in the scanning SC2.

A coupling range CE5 substantially centered on the new representative detection point NP1 is newly set, the representative detection point NP1 within the coupling range is coupled as a single object, and the position or the like of the representative detection point NP1 is output to the vehicle control section 3 as object information of a single object. Within the coupling range CE5, there is no detection point other than the representative detection point NP1. Thus, detection point coupling processing is performed using a single detection point.

Figure 11:
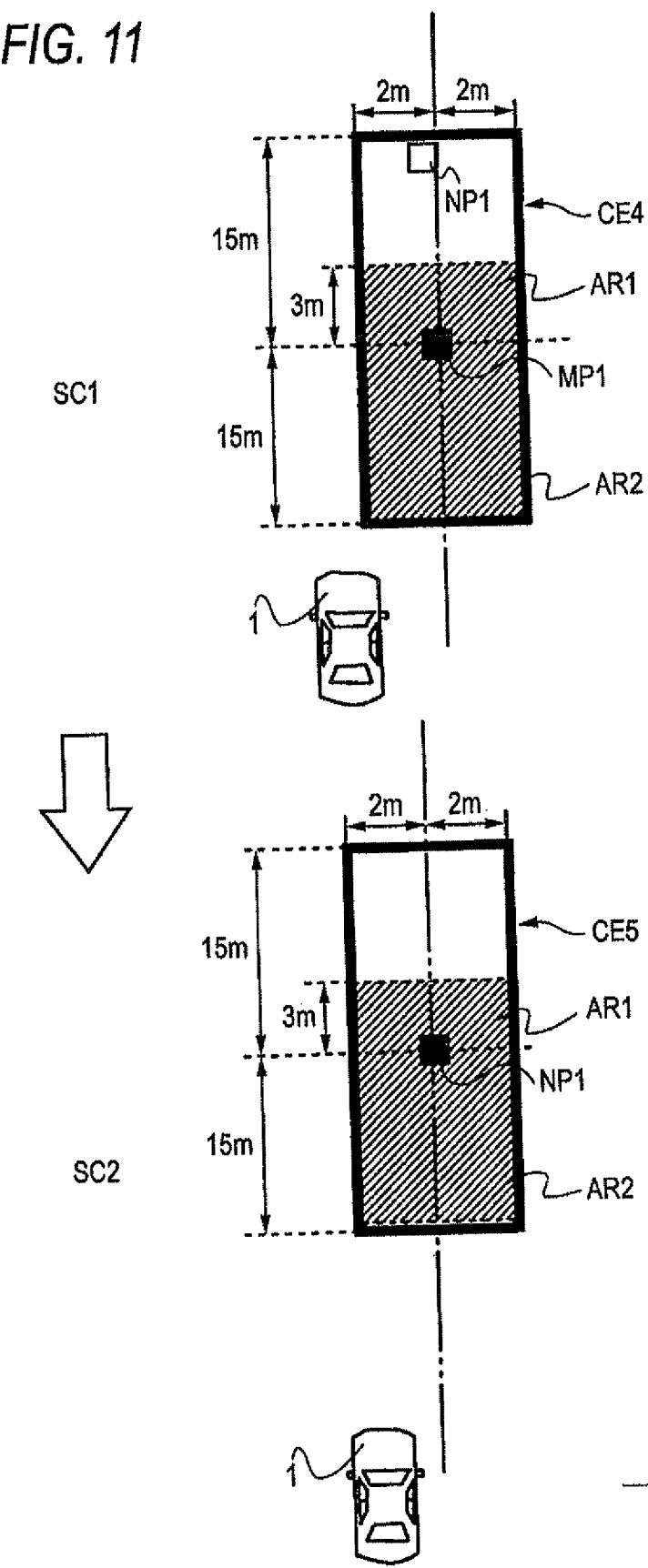
FIG. 11 is a diagram showing determination of a new object within a coupling range.

The new representative detection point NP1 exists out of the same object determination range in the past scanning SC1, such that it is determined to be an object different from past object information. That is, the new representative detection point NP1 exists at a position distant (+y direction) from the position of the representative detection point MP1 in the past scanning SC1 by equal to or more than a predetermined distance (for example, equal to or more than 3 m). For this reason, the representative detection point MP1 in the scanning SC1 and the representative detection point NP1 in the scanning SC2 are determined as different pieces of object information. With regard to the coupling range, the coupling range CE5 is used as the coupling range of object information different from the coupling range CE4 of the scanning SC1. FIG. 11 shows this processing in detail.

In scanning SC1 on the upper side of FIG. 11, a rectangular coupling range CE4 of 30 m vertically (y axis) and 4 m horizontally (x axis) substantially centered on the representative detection point MP1 is provided. A detection point NP1 exists distant (+y direction) from the representative detection point MP1. In other words, the detection point NP1 exists at a position distant from the position (+y direction) of the representative detection point MP1 by equal to or more than a predetermined distance (for example, equal to or more than 3 m).

With regard to the detection point NP1, within a coupling range in the lateral direction (2 m in the +x direction and 2 m in the −x direction) from the position of the representative detection point MP1, a range surrounded by a position (a position distant from the position of the representative detection point MP1 in the +y direction by 3 m) distant (+y direction) from the position of the representative detection point SP1 in the longitudinal direction (y-axis direction) by less than a predetermined distance (for example, less than 3 m) is set as a same object determination range AR1. Within a coupling range in the lateral direction from the position of the representative detection point MP1, a range surrounded by a position (a position distant from the position of the representative detection point MP1 in the −y direction by 15 m) from the position of the representative detection point MP1 close to the vehicle is set as a same object determination range AR2. The detection point NP1 of the scanning SC1 exists within the coupling range CE4, not within the same object determination ranges AR1 and AR2.

In current scanning SC2, there is no representative detection point MP1 of the past scanning SC1. Thus, the detection point NP1 at a close relative distance from the vehicle 1 next to the representative detection point SP1 in past scanning becomes a new representative detection point in the scanning SC2. The new representative detection point exists out of the same object determination range in past scanning, such that it is determined to be information of an object different from the representative detection point MP1. That is, in the past scanning SC1, the representative detection point NP1 exists at a position distant (+y direction) from the position of the representative detection point MP1 in the scanning SC1 by equal to or more than a predetermined distance (for example, equal to or more than 3 m). Thus, it is determined to be object information different from the representative detection point MP1 of the scanning SC1 and the representative detection point NP1 of the scanning SC2.

In the scanning SC2, a coupling range CE5 of object information different from the past scanning SC1 based on the newly set representative detection point NP1 is set, the representative detection point NP1 within the coupling range is coupled as object information, and information of the position or the like of the representative detection point NP1 is output to the vehicle control section 3 as object information. For this reason, it is possible to prevent erroneous determination of the movement direction of an object due to erroneous recognition of different objects as a single object.

On the condition that the representative detection points in multiple-times scanning are determined to be the same object, in comparison of object information based on the position or the like of the representative detection point in the past scanning SC1 and object information based on the position or the like of the representative detection point in the subsequent scanning SC2, when a predetermined condition is satisfied, the object information is transmitted to the vehicle control section 3. Thus, it is possible to prevent erroneous vehicle control when different objects are erroneously determined as a single object and, in Step S110 of FIG. 4, the positions of the representative detection points satisfy a predetermined condition.

As an example where a predetermined condition is satisfied, a case is exemplified where the position of the representative detection point in the subsequent scanning SC2 is closer to the vehicle 1 in the lateral direction than the position of the representative detection point in the past scanning SC1. In other words, a case is exemplified where object information based on the representative detection point in the past scanning SC1 and object information based on the representative detection point in the subsequent scanning SC2 are the same object information, and the position of the representative detection point in the subsequent scanning SC2 is closer to the vehicle 1 than the position of the representative detection point in the past scanning SC1. Thus, it is possible to prevent erroneous control of the vehicle 1 when different objects are erroneously determined as a single object and it is determined that the vehicle 1 is close to the object.

What is claimed is:

1. A radar device which is mounted on a vehicle and is operable to scan a transmission wave to detect a detection point representing a position of an object disposed around the vehicle on the basis of a reflected wave of the transmission wave from the object, the radar device comprising:
   a memory; and
   a signal processor configured to:
      read information of detection points from the memory which stores the information of the detection points including a first representative detection point closest to the vehicle, which are detected in a first scanning;
      determine whether or not the detection points of the read information are continuously detected in a second scanning after the first scanning;
      set a detection point which is second-closest to the vehicle and which is continuously detected in the second scanning from among detection points disposed within a predetermined range from the first representative detection point in the first scanning as a second representative detection point in the second scanning when the first representative detection point is not detected in the second scanning; and
      determine that the first representative detection point and the second representative detection point are information of different objects when the second representative detection point exists at a position distant from a position of the first representative detection point by a distance equal to or more than a predetermined distance.

2. The radar device as set forth in claim 1, wherein the signal processor is configured to determine that the first representative detection point and the second representative detection point are information of a same object when the second representative detection point exists at a position distant from the position of the first representative detection point by less than the predetermined distance.

3. The radar device as set forth in claim 1, wherein, when a comparison result of a position of the first representative detection point and a position of the second representative detection point satisfies a predetermined condition, in a case where the signal processor determines that the first representative detection point and the second representative detection point are information of a same object, the signal processor transmits information of the object to a control device that controls the vehicle.

4. The radar device as set forth in claim 3, wherein the signal processor, when the position of the second representative detection point is closer to the vehicle in a lateral direction than the position of the first representative detection point, in the case where the object determination unit determines that the first representative detection point and the second representative detection point are information of the same object, transmits the information of the object to the control device.

5. An object detection system, comprising:
   the radar device as set forth in claim 3; and
   a control device that controls the vehicle on the basis of the information of the object, transmitted from the radar device.

6. An object detection method using a radar device operable to scan a transmission wave to detect a detection point representing a position of an object disposed around the vehicle on the basis of a reflected wave of the transmission wave from the object, and detect information of the object on the basis of the detection point, the object detection method executed by a signal processor and comprising:
   reading information of detection points from a memory which stores the information of the detection points including a first representative detection point closest to the vehicle, which are detected in a first scanning;
   determining whether or not the detection points of the read information are continuously detected in a second scanning after the first scanning;
   setting a detection point which is second-closest to the vehicle and which is continuously detected in the second scanning from among detection points disposed within a predetermined range from the first representative detection point in the first scanning as a second representative detection point in the second scanning when the first representative detection point is not detected in the second scanning; and determining that the first representative detection point and the second representative detection point are information of different objects when the second representative detection point exists at a position distant from a position of the first representative detection point by a distance equal to or more than a predetermined distance.

* * * * *